United States Patent

Ohta et al.

[11] Patent Number: 5,078,079
[45] Date of Patent: Jan. 7, 1992

[54] GAUGE FOR VEHICLE

[75] Inventors: Noriaki Ohta; Minoru Iwazaki; Hiroyasu Shiratori, all of Shimada, Japan

[73] Assignee: Yazaki Corporation, Tokyo, Japan

[21] Appl. No.: 672,906

[22] Filed: Mar. 21, 1991

[30] Foreign Application Priority Data

Mar. 23, 1990 [JP] Japan ............................ 2-29094[U]
Oct. 18, 1990 [JP] Japan ........................... 2-108435[U]

[51] Int. Cl.$^5$ .................... G01D 11/28; G01D 13/26; H01R 39/00
[52] U.S. Cl. ............................... 116/288; 116/286; 116/DIG. 36; 116/328; 439/13; 439/931; 362/29
[58] Field of Search ............... 116/286, 284, 288, 291, 116/303, 305, 328, 327, 287; 362/29, 55; 439/13, 27, 29, 617, 931

[56] References Cited

U.S. PATENT DOCUMENTS

| | | | |
|---|---|---|---|
| 2,314,817 | 3/1943 | Christensen | 116/288 X |
| 2,387,015 | 10/1945 | Gilbertson | 439/27 |
| 2,768,605 | 10/1956 | Sturges | 116/DIG. 36 X |
| 2,891,230 | 6/1959 | Smith | 439/931 X |
| 2,920,543 | 1/1960 | Azarraga | 439/29 X |
| 3,568,630 | 3/1971 | Blackwell | 116/288 |
| 3,629,784 | 12/1971 | Bjorn et al. | 439/29 X |
| 4,163,428 | 8/1979 | Ishikawa | 116/288 |
| 4,252,078 | 2/1981 | Fukasawa et al. | 116/288 |
| 4,902,235 | 2/1990 | Tonooka | 439/931 X |

FOREIGN PATENT DOCUMENTS

| | | | |
|---|---|---|---|
| 0589553 | 12/1959 | Canada | 116/286 |
| 0961694 | 5/1950 | France | 116/286 |

Primary Examiner—William A. Cuchlinski, Jr.
Assistant Examiner—John L. Beres
Attorney, Agent, or Firm—Venable, Baetjer, Howard & Civiletti

[57] ABSTRACT

A gauge for a vehicle has a spontaneous light-emission type pointer with a built-in light-emitting device. The pointer is fixed to a pointer shaft rotatably driven in accordance with a measured value. A solid circuit member for supporting a light-emitting device and for coupling the light-emitting device to the pointer shaft is fixed to the pointer. The solid circuit member has a first plated conductive layer for electrically connecting one of the terminals of the light-emitting device to the pointer shaft, and a second plated conductive layer for electrically connecting the other of the terminals to a spring abutment fixed to the pointer shaft in an insulating fashion. The solid circuit member is connected to a power source for lighting the light-emitting device. Consequently, a number of parts required for supplying power to the light-emitting diode can be reduced.

14 Claims, 3 Drawing Sheets

GAUGE FOR VEHICLE

BACKGROUND OF THE INVENTION

1. Field of the Invention

The present invention relates to a gauge for a vehicle, and more particularly, to a gauge for a vehicle having a spontaneous light-emission type pointer.

2. Description of Related Art

Gauges for vehicles which use a light-emitting device, such as a light-emitting diode, as a light source for a spontaneous light-emission type pointer are known. Such gauges for vehicles generally include a drive unit which serves as a gauge body for driving a pointer shaft in accordance with a measured value, a dial, a light-guiding member disposed behind the dial for guiding the light for illuminating the characters or scales printed on the dial to the rear surface of the dial, and a pointer fixed to the pointer shaft.

A two-sided printed plate board is fixed to the proximal end of an indicating portion of the pointer. A light-emitting diode, which is the light emitting device serving as a light source, is mounted on the upper surface of the two-sided printed plate board with a pair of lead terminals thereof being electrically and mechanically connected to a conductive pattern of the two-sided printed plate board by, for example, soldering One end of a pointer stand, made of a conductive material, is fixed to the center of the two-sided printed plate board by caulking in such a manner that the pointer stand is electrically connected to the conductive pattern formed on the upper surface of the two-sided printed plate board connected to one of the lead terminals of the light-emitting diode. The pointer stand has a through-hole into which the distal end of the pointer shaft is tightly fitted.

The drive unit is attached to the rear surface of the light-guiding member in such a manner that the pointer shaft is located at the center of an opening of the dial and at an opening of the light-guiding member by fixing two mounting pieces of the drive unit to the light-guiding member by screws. First and second terminals are respectively mounted on the proximal ends of the mounting pieces. A first spring abutment, made of a conductive material, is fixed to the pointer shaft for connecting the inner end of a first spiral restoring spring for restoring the pointer to a zero indicating position to the pointer shaft. The first spiral restoring spring may be made of phosphor bronze.

Also, an insulating washer, made of an insulating material, is fixedly fitted on the pointer shaft. The insulating washer has a through-hole at the center thereof, and a large-diameter collar at the lower end thereof. The through-hole formed at the center of the insulating washer consists of a small-diameter portion into which the pointer shaft is inserted, and a large-diameter portion into which the large-diameter portion formed on part of the outer periphery of the pointer stand is fitted. A second spring abutment, made of a conductive material, is fixed to the outer periphery of the insulating washer for connecting the inner end of a second spiral spring to the insulating washer. The outer end of the second spiral spring is fixed to the second terminal. The large-diameter collar of the insulating washer is located between the first and second spiral springs in order to prevent contact thereof.

A spring receiver, made of a conductive material, is mounted on the outer periphery of the insulating washer. The spring receiver is in contact with the second spring abutment. A coil spring, made of a metal, is provided between the spring receiver and the under surface of the two-sided print plate board in such a manner that one end of the coil spring is connected to the conductive pattern on the undersurface of the two-sided printed plate board which is in turn connected electrically to the other of the lead terminals of the light-emitting diode. The spring receiver has a vertical wall portion having an inner diameter slightly larger than the outer diameter of the coil spring so that it can receive the coil spring in a stable state. In this way, a predetermined electrical connection is assured and contact of the coil spring with other components is prevented.

Hence, one of the lead terminals of the light-emitting diode is connected to the first terminal through the conductive pattern on the upper surface of the two-sided printed plate board, the pointer stand, the pointer shaft, the first spring abutment, and then the first spiral spring, while the other lead terminal is connected to the second terminal through the conductive pattern on the undersurface of the two-sided printed plate board, the coil spring, the spring receiver, the second spring abutment and then the second spiral spring.

Consequently, a current can be supplied to the light-emitting diode by connecting a power source between the first and second terminals.

The above-described gauge for the vehicle is assembled in the manner described below: the drive unit with the first spring abutment, the first spiral spring, the insulating washer, the second spring abutment, and the second spiral spring incorporated beforehand is first mounted on the light-guiding member, and then the coil spring is mounted through the openings, Thereafter, the pointer stand of the assembled pointer is fitted into the through-hole of the insulating washer while the distal end of the pointer shaft is inserted into the through-hole of the pointer stand, by which the coil spring is provided between the two-sided printed plate board and the spring receiver so as to achieve a predetermined electrical connection.

In the above-described type conventional gauge for a vehicle, a large number of parts which are not associated with the function of the gauge, such as the two-sided printed plate board, the coil spring and the spring receiver, must be incorporated in the gauge to provide power supply to the light-emitting diode, which is the light-emitting device serving as the light source for the spontaneous light-emission pointer, in a way that supply of power does not adversely affect the drive of the pointer of the gauge. Consequently, the number of parts is increased, the assemby property is not good, and good electrical conduction cannot be provided. These result in an increase in the production cost and in imbalance of the pointer.

SUMMARY OF THE INVENTION

In view of the aforementioned problems of the conventional technique, an object of the present invention is to provide a gauge for a vehicle which enables decrease in a number of parts required for supplying power to a light-emitting device for brightening a spontaneous light-emission pointer, which enables assembly property of the pointer to be improved, and which enables the electric conduction of a conducting path required for supplying power to the light-emitting device to be improved.

To achieve the above-described object, the present invention provides a gauge for a vehicle in which a light-emitting device is built in a pointer fixed to a pointer shaft rotated in accordance with a measured value. A pair of terminals of the light-emitting device are connected to power sources respectively through a pointer shaft, a first spring abutment fixed to the pointer shaft and then a first spiral spring whose inner end is fixed to the first spring abutment and through a second spring abutment fixed to the pointer shaft in an insulating fashion and then a second spiral spring whose inner end is fixed to the second spring abutment. The light emitted by the light-emitting device is introduced into the indicating portion of the pointer so as to brighten the indicating portion. At the proximal end of the indicating portion of the pointer is provided a solid circuit member for supporting the light-emitting device. The solid circuit member has a first plated conductive layer for electrically connecting one of the pair of terminals of the light-emitting device to the pointer shaft, and a second plated conductive layer for electrically connecting the other of the pair of terminals to the second spring abutment.

The solid circuit member has a pair of terminal inserting holes into which the pair of terminals of the light-emitting device are respectively inserted. The first and second plated conductive layers are respectively formed on the inner peripheral surfaces of the pair of terminal inserting holes. A contact is fitted into each of the terminal inserting holes. The contact has an annular portion which is in elastic contact with the conductive plated layer formed on the inner periphery of the terminal inserting hole, and a contact piece which is in elastic contact with the terminal of the light-emitting device inserted into the terminal inserting hole. The annular portion and the contact piece are formed of an elastic metal material as one unit.

The solid circuit member has a shaft inserting hole into which the pointer shaft is inserted. The first plated conductive layer is formed on the inner periphery of the shaft inserting hole. A metal pointer stand having a pointer shaft inserting hole at the center thereof is fitted into the shaft inserting hole in such a manner that it is brought into contact with the plated conductive layer formed on the inner periphery of the shaft inserting hole.

In the thus-arranged gauge for the vehicle, the first plated conductive layer of the solid circuit member provided at the proximal end of an indicating portion of the pointer provides an electrical connection between one of the pair of terminals of the light-emitting device, and the second plated conductive layer provides an electrical connection between the other of the terminals of the light-emitting device to the second spring abutment. Consequently, a power supply path for supplying power to the light-emitting device to lit it up can be simplified.

Furthermore, the contacts, formed of the elastic metal member, are respectively inserted into the pair of terminal inserting holes in the solid circuit member on the inner periphery of which the first and second plated conductive layers are respectively formed. At that time, the annular portion of each of the contacts is in elastic contact with the plated conductive layer, and the contact piece is in elastic contact with the terminal of the light-emitting device inserted into the terminal inserting hole. Consequently, electrical connection between the light-emitting device and the plated conductive layers can be simplified and made reliable.

Furthermore, the metal pointer stand is fitted into the shaft inserting hole in the solid circuit member on the inner periphery of which the first plated conductive layer is formed. At that time, the pointer stand is in contact with the plated conductive layer, and the pointer shaft is inserted into the pointer shaft inserting hole formed at the center of the pointer stand. Consequently, electric connection between the pointer shaft and the first plated conductive layer can be simplified and made reliable.

BRIEF DESCRIPTION OF THE DRAWINGS

Other objects and advantages of the invention will become apparent from the following description of preferred embodiments taken in connection with the accompanying drawings, wherein.

DETAILED DESCRIPTION OF THE PREFERRED EMBODIMENTS

Figure 1:
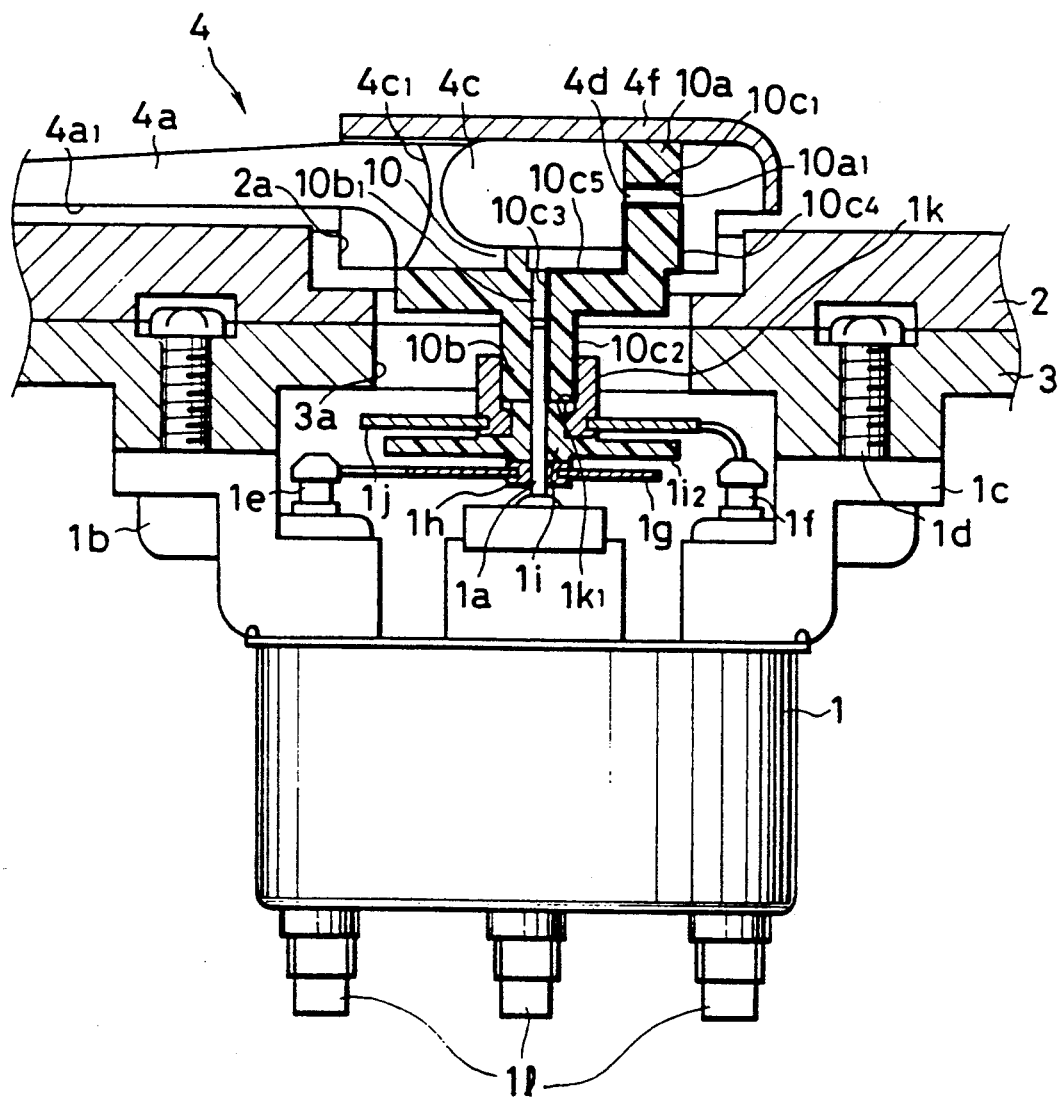
FIG. 1 is a vertical cross-sectional view of a first embodiment of a gauge for a vehicle according to the present invention.

Referring first to FIG. 1, a gauge for a vehicle includes a drive unit 1 which serves as a gauge body for driving a pointer shaft 1a in accordance with a measured value, a dial 2, a light-guiding member 3 disposed behind the dial 2 for guiding the light for illuminating the characters or scales printed on the dial 2 to the rear surface of the dial 2, and a pointer 4 fixed to the pointer shaft 1a.

An indicating portion 4a of the pointer 4 is made of a transparent acrylic resin or the like. A undersurface 4a1 of the indicating portion 4a tapered in such a manner that the thickness thereof increases toward the distal end thereof forms a irregularly reflecting surface. A solid circuit member 10 is fixed to the proximal end of the indicating portion 4a. The solid circuit member 10 includes a supporting portion 10a for supporting a light-emitting diode 4c, and a pointer stand portion 10b for coupling the light-emitting diode 4c to the pointer shaft 1a. The solid circuit member 10 is formed of an insulating material, such as a synthetic resin, as one unit.

The supporting portion 10a has a pair of terminal inserting holes 10a1 into which a pair of lead terminals 4d of the light-emitting diode 4c are tightly fitted, and the pointer stand portion 10b has a inserting hole 10b1 into which the distal end of the pointer shaft 1a is tightly fitted. A pair of electrically separated plated conductive layers 10c1 (only one being shown in FIG. 1) are respectively formed on the inner peripheral surfaces of the pair of terminal inserting holes 10a1 and the vicinity thereof. Electrically separated plated conductive layers 10c2 and 10c3 are respectively formed on the outer peripheral surface of the pointer stand portion 10b and the inner peripheral surface of the shaft inserting hole 10b1. One of the pair of plated conductive layers 10c1 is electrically connected to the plated conductive layer 10c2 by a plated conductive layer 10c4 formed on the outer surface of the solid circuit member 10. The other of the pair of plated conductive layers 10c1 is electrically connected to the plated conductive layer 10c3 by a plated conductive layer 10c5 formed on the inner surface of the solid circuit member 10.

The drive unit 1 is attached to the rear surface of the light-guiding member in such a manner that the pointer shaft 1a is located at the center of an opening 2a of the dial 2 and at an opening 3a of the light-guiding member 3 by fixing two mounting pieces 1b and 1c of the drive unit 1 to the light-guiding member 3 by screws 1d. First and second terminals are respectively mounted on the proximal ends of the mounting pieces 1b and 1c. A first spring abutment 1h, made of a conductive material, is fixed to the pointer shaft 1a for connecting the inner end of a first spiral restoring spring 1g for restoring the pointer 4 to a zero indicating position to the pointer shaft 1a. The first spiral restoring spring 1g may be made of phosphor bronze. The outer end of the first spiral spring 1g is fixed to the first terminal 1e.

Also, an insulating washer 1i, made of an insulating material, is fixedly fitted on the pointer shaft 1a. The insulating washer 1i has a large-diameter collar portion 1i2 at the lower end thereof. A second spring abutment 1k, made of a conductive material, is fixed to the outer periphery of the insulating washer 1i to connect the inner end of a second spiral spring 1j to the insulating washer 1i. The outer end of the second spiral spring 1j is fixed to the second terminal 1f. The large-diameter collar portion 1i2 of the insulating washer 1i is located between the first and second spiral springs 1g and 1j so that it prevents contact thereof.

The second spring abutment 1k has a stand accommodating portion 1k1 for receiving the pointer stand portion 10b when the pointer shaft 1a is inserted into the shaft inserting hole 10b1 of the pointer stand portion 10b and thereby providing an electrical connection between the plated conductive layer 10c2 formed on the outer peripheral surface of the pointer stand portion 10b and the spring abutment 1k.

A pointer cap 4f is mounted on the proximal end of the pointer 4 so as to mask a light introducing portion 4c1 of the indicating portion 4a and the light-emitting diode 4c.

Reference numerals 11 denote terminals for supplying an input signal to drive the drive unit 1.

In the thus-arranged gauge for a vehicle, one of the lead terminals 4d of the light-emitting diode 4c is connected to the first terminal 1e through the plated conductive layer 10c1 formed on one of the terminal inserting holes 10a1 in the supporting portion 10a of the solid circuit member 10, the plated conductive layer 10c5 formed on the inner surface, the plated conductive layer 10c3 formed on the inner peripheral surface of the shaft inserting hole 10b1 in the pointer stand portion 10b, the pointer shaft 1a, the spring abutment 1h and then the spiral spring 1g. The other lead terminal of the light-emitting diode 4c is connected to the second terminal 1f through the plated conductive layer 10c1 formed on the other of the terminal inserting holes 10a1 in the supporting portion 10a of the solid circuit member 10, the plated conductive layer 10c4 formed on the outer surface, the plated conductive layer 10c2 formed on the outer peripheral surface of the pointer stand portion 10b, the spring abutment 1k and then the spiral spring 1j.

Consequently, a current can be supplied to the light-emitting diode 4c by connecting a power source between the first and second terminals 1e and 1f. The light emitted from the light-emitting diode 4c is directly introduced into the indicating portion 4a from the light introducing portion 4c1. The introduced light is irregularly reflected by the irregularly reflecting surface formed on the undersurface 4a1 of the indicating portion 4a, by which the indicating portion 4a brightens uniformly at a high luminance.

The above-described gauge for the vehicle is assembled in the manner described below: the drive unit 1 with the first spring abutment 1h, the first spiral spring 1g, the insulating washer 1i, the second spring abutment 1k, and the second spiral spring 1j incorporated beforehand is first mounted on the light-guiding member 3, and then the distal end of the pointer shaft 1a is inserted into the shaft inserting hole 10b1 in the pointer stand portion 10b of the solid circuit member 10 provided on the assembled pointer 4 through the openings 2a and 3a while the pointer stand portion 10b is inserted into the stand accommodating portion 1k1 of the spring abutment 1k, by which the plated conductive layer 10c3 is brought into contact with the pointer shaft 1a while the plated conductive layer 10c2 is brought into contact with the spring abutment 1k and a predetermined electric connection is thus achieved.

In the above-described gauge for the vehicle, since the electrical connection between the pointer shaft 1a and the spring abutment 1k and the pair of lead terminals of the light-emitting diode 4c is provided through the solid circuit member having the plated conductive layers 10c1 to 10c5 formed on the body made of an insulating material, the number of parts which are not associated with the function of the gauge can be reduced. Consequently, the number of parts can be reduced, the assembly property and electric conductivity can be improved, production cost can be reduced, and the pointer can be well balanced.

Figure 3:
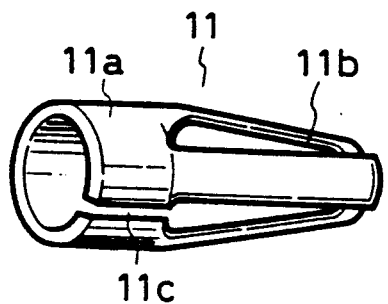
FIG. 3 is a perspective view of a contact shown in FIG. 2.
Figure 4:
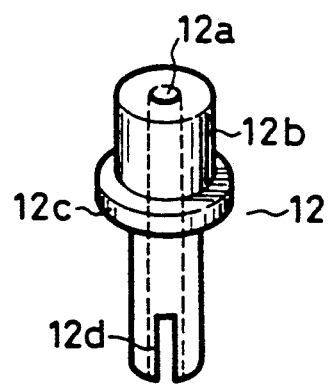
FIG. 4 is a perspective view of a pointer stand shown in FIG. 2.

In the embodiment shown in FIG. 1, the lead terminals 4d of the light-emitting diode 4c are directly inserted into the pair of terminal inserting holes 10a1 formed in the supporting portion 10a of the solid circuit member 10 so as to achieve an electrical connection between the lead terminals 4d and the plated conductive layers 10c1 formed on the inner periphery of the terminal inserting holes 10a1. The pointer shaft 1a is directly inserted into the shaft inserting hole 10b1 formed in the pointer stand portion 10b of the solid circuit member 10 so as to achieve an electric connection between the pointer shaft 1a and the plated conductive layer 10c3 formed on the inner periphery of the shaft inserting hole 10b1. A second embodiment, which will be described below with reference to FIGS. 2 to 4, shows a configuration which further assures contact between the plated conductive layers and the terminals or between the plated conductive layer and the pointer shaft, which is capable of increasing the contact pressure, which is capable of preventing peel-off of the plated conductive layers, and which is capable of preventing conduction failure from occurring when the terminals or pointer shaft are removed for maintenance.

Figure 2:
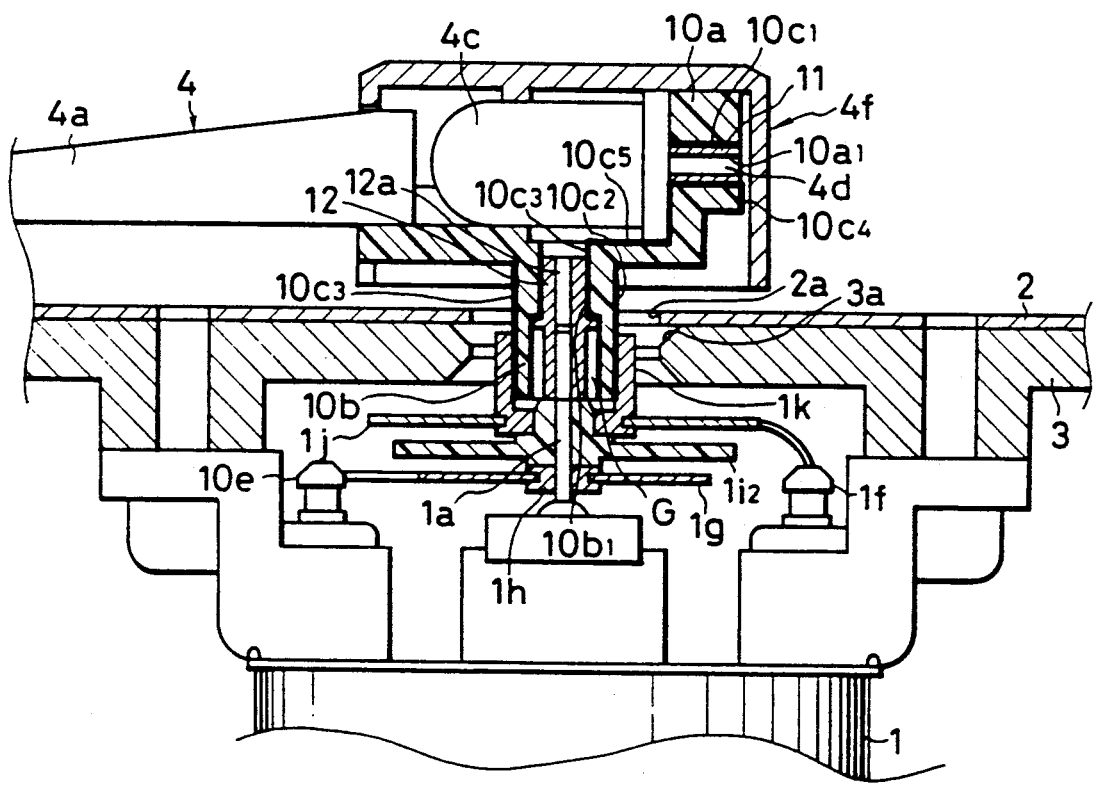
FIG. 2 is a vertical cross-sectional view of a second embodiment of a gauge for a vehicle according to the present invention.

In FIG. 2, the same reference numerals are used to denote parts which are the same as those shown in FIG. 1, detailed description thereof being omitted. In the second embodiment, a contact 11 is fitted into each of the pair of terminal inserting holes 10 formed in the supporting portion 10a of the solid circuit member 10, and a metal pointer stand 12 is fitted into the shaft inserting hole 10b1 formed in the pointer stand portion 10b.

The contact 11 includes an annular portion 11a which elastically makes contact with the plated conductive layer 10c1 formed on the inner periphery of the terminal inserting hole 10a1, and a contact piece 11b which elastically makes contact with the lead terminal 4c1 of the light-emitting diode 4c inserted into the terminal inserting hole 10a1. The annular portion 11a and the contact piece 11b are made of an elastic metal material having a good conductivity as one unit. The annular portion 11a has a slit 11c so as to allow the annular portion 11a to be compressed within the range of the slit 11c when the contact 11 is fitted into the terminal inserting hole 10a1 from the contact piece 11b. The annular portion 11a is kept in contact with the plated conductive layer 10c1 by the reaction generated by the compression.

The metal pointer stand 12 is manufactured by cutting a conductive metal material, such as phosphor bronze. The pointer stand 12 has a pointer shaft inserting hole 12a at the center thereof. The metal pointer stand 12 includes a contact portion 12b which makes contact with the plated conductive layer 10c3 when the pointer stand 12 is fitted into the shaft inserting hole 10b1, a collar portion 12c which makes abutment with a shoulder in the shaft inserting hole 10b1 and thereby limits insertion of the pointer stand 12, and a slit 12d formed along the pointer shaft inserting hole 12a starting from the pointer shaft inserting end of the pointer shaft inserting hole 12a. The metal pointer stand 12 and the shaft inserting hole 10b1 are formed such that a gap G having an adequate size is formed between the portion of the outer peripheral surface of the metal pointer stand 12 which is located below the collar portion 12c, i.e., the portion of the outer peripheral surface located on the side of the shaft inserting end, and the inner peripheral surface of the shaft inserting hole 10b1.

The lead terminals 4d of the light-emitting diode 4c are each inserted into the contact 11 fitted into the terminal inserting hole 10a1 in the supporting portion 10a of the solid circuit member 10 in such a manner that the annular portion 11a thereof is in elastic contact with the plated conductive layer 10c1, and is thereby brought into elastic contact with the contact piece 11b. The pointer shaft 1a is fitted into the pointer shaft inserting hole 12a formed at the center of the metal pointer stand 12 fitted into the shaft inserting hole 10b1 in the pointer stand portion 10b of the solid circuit member 10, the contact portion 12b of the metal pointer stand of which is in contact with the plated conductive layer 10c3. Hence, one of the lead terminals 10d of the light-emitting diode 4c is electrically connected to the first terminal 1e through the contact 11, the plated conductive layer 10c1, the plated conductive layer 10c4 formed on the inner surface, the plated conductive layer 10c5 formed on the inner peripheral surface of the pointer stand portion 10b, the metal pointer stand 12, the pointer shaft 1a, the spring abutment 1h and then the spiral spring 1g. The other of the lead terminals 4d of the light-emitting diode 4c is connected to the second terminal 1f through the contact 11, the plated conductive layer 10cl, the plated conductive layer 10c4 formed on the outer surface, the plated conductive layer 10c2 formed on the outer peripheral surface of the pointer stand portion 10b, the spring abutment 1k and then the spiral spring 1j. Consequently, a current can be supplied to the light-emitting diode 4c by connecting a power source between the first and second terminals 1e and 1f.

In the second embodiment, electric connection between the lead terminal 4d of the light-emitting diode 4c and the plated conductive layer 10c1 is conducted through the contact 11. At this time, since the contact 11 is in elastic contact with the lead terminal 4d and with the plated conductive layer 10c1, highly reliable electric connection is provided.

Furthermore, electric connection between the pointer shaft 1a and the plated conductive layer 10c3 is conducted through the metal pointer stand 12. Consequently, the degree of freedom of the contact increases as compared with the case where the pointer shaft 1a is directly in contact with the plated conductive layer 10c3, and good electric connection is thus attained. In this embodiment, since the contact portion 12b of the metal pointer stand 12 has a large diameter, contact area is increased. Furthermore, formation of the slit enables the pointer shaft 1 a to be brought into elastic contact with the metal pointer stand 12. This provides highly reliable electrical connection.

Furthermore, the gap G having an adequate size, formed between the portion of the outer peripheral surface of the metal pointer stand 12 which is located below the collar portion 12c thereof and the inner peripheral surface of the shaft inserting hole 10b1, is effective to release the stress generated when the pointer shaft 1a is fitted into the pointer shaft inserting hole 12a and when the pointer stand portion 10b of the solid circuit member 10 is fitted into the stand accommodating portion 1k1 of the spring abutment 1k. Consequently, damage to the pointer stand portion 10b and the peel-off of the plated conductive layer formed on the inner peripheral surface of the pointer stand portion 10b can be prevented.

In the above-described embodiments, a light-emitting diode having two terminals is used. However, a light-emitting diode having three terminals may also be used.

What is claimed is:

1. A gauge for a vehicle, comprising:
    a pointer shaft rotated in accordance with a measured value;
    a pointer fixed to said pointer shaft, said pointer having an indicating portion and a light-emitting device for brightening said indicating portion, said light-emitting device having a pair of terminals;
    a first spring abutment fixed to said pointer shaft and a first spiral spring whose inner end is fixed to said first spring abutment;
    a second spring abutment fixed to said pointer shaft in such a manner that insulation is achieved between said pointer shaft and said second spring abutment and a second spiral spring whose inner end is fixed to said spring abutment;
    a power supply means connected to one of the terminals of said light-emitting device through said pointer shaft, said first spring abutment and then said first spiral spring and to the other terminal of said light-emitting device through said second spring abutment and said second spiral spring for lighting up said light-emitting device; and
    a solid circuit member provided at a proximal end of said pointer, said solid circuit member having a first conductive plate layer for electrically connecting one of the terminals of said light-emitting device to said pointer shaft and a second conductive plate layer for electrically connecting the other terminal to said second spring abutment.

2. A gauge for a vehicle according to claim 1, wherein said sold circuit member has a pair of terminal inserting holes into which said pair of terminals of said light-emitting device are respectively inserted, said first and second conductive plate layers being respectively formed on the inner peripheries of said pair of terminal inserting holes.

3. A gauge for a vehicle according to claim 2, wherein a contact is fitted into each of said terminal inserting holes, said contact having an annular portion which is in elastic contact with the plated conductive layer formed on the inner periphery of said terminal inserting hole and a contact piece which is in elastic contact with the terminal of said light-emitting device inserted into the terminal inserting hole, said annular portion and said contact piece being formed of an elastic metal material as one unit.

4. A gauge for a vehicle according to claim 1, wherein said solid circuit member has a shaft inserting hole into which said pointer shaft is inserted, said first plated conductive layer being formed on the inner periphery of said shaft inserting hole.

5. A gauge for a vehicle according to claim 4, wherein a metal pointer stand is fitted into said shaft inserting hole in such a manner that it is in contact with the plated conductive layer formed on the inner periphery thereof, said metal pointer stand having a pointer shaft inserting hole.

6. A gauge for a vehicle, comprising:
a pointer means including a pointer shaft and a pointer fixed to said pointer shaft, said pointer having an indicating portion and a light-emitting device for brightening said indicating portion, said light-emitting device having a pair of terminals;
a dial displayed by said indicating portion of said pointer;
a drive unit for driving said pointer shaft in accordance with a measured value and thereby bringing the indicating portion of said pointer to a position on said dial to be displayed;
a pair of mounting members for mounting said dial on said drive unit;
a first light-emitting device lighting current supply means provided on one of said pair of mounting members, said first current supply means being connected to said pointer shaft through a first spring abutment fixed to said pointer shaft and a first spiral spring whose inner end is fixed to said first spring abutment;
a second light-emitting device lighting current supply means provided on the other of said mounting members, said second current supply means being connected to a second spring abutment fixed to said pointer shaft in an insulating state and to a second spiral spring whose inner end is fixed to said second spring abutment; and
a solid circuit member provided at a proximal end of said indicating portion of said pointer, said solid circuit member including a portion for supporting said light-emitting device and a portion for coupling said light-emitting device to said pointer shaft, said solid circuit member having a first plated conductive layer for electrically connecting one of the terminals of said light-emitting device to said pointer shaft and a second plated conductive layer for electrically connecting the other of said terminals to said second spring abutment.

7. A gauge for a vehicle according to claim 6, wherein said supporting portion of said solid circuit member has a pair of terminal inserting holes into which the pair of terminals of said light-emitting device are inserted while said pointer shaft coupling portion has a shaft inserting hole into which a distal end of said pointer shaft is inserted.

8. A gauge for a vehicle according to claim 7, wherein said first plated conductive layer is formed on one of said pair of terminal inserting holes, an inner surface of said solid circuit member and an inner peripheral surface of said shaft inserting hole while said second plated conductive layer is provided on the other of said pair of terminal inserting holes, an outer surface of said solid circuit member and an outer peripheral surface of said pointer shaft coupling portion.

9. A gauge for a vehicle according to claim 8, wherein said second spring abutment has a pointer shaft coupling portion accommodating portion for conducting electrical connection between said second spring abutment and the outer peripheral surface of said pointer shaft coupling portion.

10. A gauge for a vehicle according to claim 7, wherein a contact is fitted into each of said terminal inserting holes, said contact having an annular portion which is in elastic contact with the plated conductive layer formed on the inner periphery of said terminal inserting hole and a contact piece which is in elastic contact with the terminal of said light-emitting device inserted into said terminal inserting hole, said annular portion and said contact piece being formed of an elastic metal member as one unit.

11. A gauge for a vehicle according to claim 7, wherein a metal pointer stand is fitted into said shaft inserting hole in such a manner that it is in contact with the plated conductive layer formed on the inner periphery of said shaft inserting hole, said metal pointer stand having a pointer shaft inserting hole at the center thereof.

12. A gauge for a vehicle according to claim 11, wherein said metal pointer stand has a large-diameter portion which makes contact with the plated conductive layer.

13. A gauge for a vehicle according to claim 11, wherein said metal pointer stand has a slit so as to allow said pointer stand to make elastic contact with said pointer shaft.

14. A gauge for a vehicle according to claim 11, wherein said metal pointer stand has a collar portion, and wherein a gap is formed between an outer peripheral surface of said metal pointer stand and the inner peripheral surface of said shaft inserting hole.

* * * * *